United States Patent
Dwyer et al.

[19]

[11] Patent Number: 5,885,155
[45] Date of Patent: Mar. 23, 1999

[54] THRESHING ASSEMBLY FOR A COMBINE

[75] Inventors: Sushil V. Dwyer, Arkansas City; Mark R. Underwood, Burr Oak, both of Kans.

[73] Assignee: Deere & Company, Moline, Ill.

[21] Appl. No.: 846,283

[22] Filed: Apr. 30, 1997

[51] Int. Cl.⁶ ..................................................... A01F 12/20
[52] U.S. Cl. .............................. 460/72; 460/109; 460/110
[58] Field of Search ................................. 460/71, 69, 72, 460/73, 108, 109, 110, 113, 901

[56] References Cited

U.S. PATENT DOCUMENTS

| | | | |
|---|---|---|---|
| 3,664,100 | 5/1972 | Rowland-Hill | 460/71 X |
| 4,422,463 | 12/1983 | West | 460/71 X |
| 4,489,733 | 12/1984 | Underwood . | |

FOREIGN PATENT DOCUMENTS 7 807 529   1/1979   Netherlands ............................ 460/72

*Primary Examiner*—Terry Lee Melius
*Attorney, Agent, or Firm*—James E. Bradley

[57] ABSTRACT

A threshing assembly is provided for a combine having a frame mounted on wheels and a longitudinal axis. The threshing assembly is formed from a threshing rotor disposed within a perforated threshing cage. At least one helical vane, formed of high strength plastic, mounts to the interior of the threshing cage and extends along the length of the threshing cage. The radial height of the vane is graduated along the length of the threshing cage from the forward end to the rearward end for threshing of different size grain crop. Rasp bars of the threshing rotor also have heights that increase along the length of the threshing rotor, from the forward end to the rearward end, to correspond to the decrease in height of the vanes.

6 Claims, 2 Drawing Sheets

THRESHING ASSEMBLY FOR A COMBINE

BACKGROUND OF THE INVENTION

1. Field of the Invention

This invention relates generally to grain combines, and in particular, to an improved threshing assembly for a combine.

2. Description of the Prior Art

A grain combine threshing section has two primary parts. These are the threshing rotor and cage. The threshing rotor rotates within the threshing cage and has rasp bars mounted on its outer surface. The threshing cage is perforated and may rotate along with the threshing rotor, but at slower speed. Steel vanes are mounted to the interior surface of the threshing cage. Crop is introduced into the space between the threshing rotor and the threshing cage. As material passes between the threshing rotor and cage, the rasp bars provide agitation and shear to separate the grain from the remainder of the crop. The threshed grain passes through the perforations of the threshing cage so that it can be collected.

For effective threshing, the clearance between the rasp bars of the threshing rotor and the interior of the threshing cage are set according to the type of crop being threshed. Decreasing the clearance between the rasp bars and threshing cage can improve threshing. Yet if this clearance is too small, grain damage can occur. Therefore, larger grains require greater clearances between the rasp bars and the threshing concave, where the crop is threshed. Because of this, the threshing assembly or its components has to be adjusted to provide the necessary clearances for the type of crop being harvested. This is undesireable due to the labor and time required to modify the threshing assembly.

What is therefore needed is a threshing assembly that can accommodate crops of different grain sizes without the necessity of adjusting of the threshing assembly.

SUMMARY OF THE INVENTION

A threshing assembly is provided for a combine having a frame mounted on wheels. The threshing assembly is formed from a threshing cage having a forward end and a rearward end. The threshing cage is mounted to the frame of the combine. The threshing assembly also includes a threshing rotor having a forward end and a rearward end. The threshing rotor is disposed within the threshing cage. The threshing rotor is provided with means for rotating the threshing rotor about an axis. At least one helical vane mounts to the interior of the threshing cage. The helical vane extends along the length of threshing cage. The radial height of the vane is graduated along the length of the threshing cage from the forward end to the rearward end for threshing of different size grain crop.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

Figure 1:
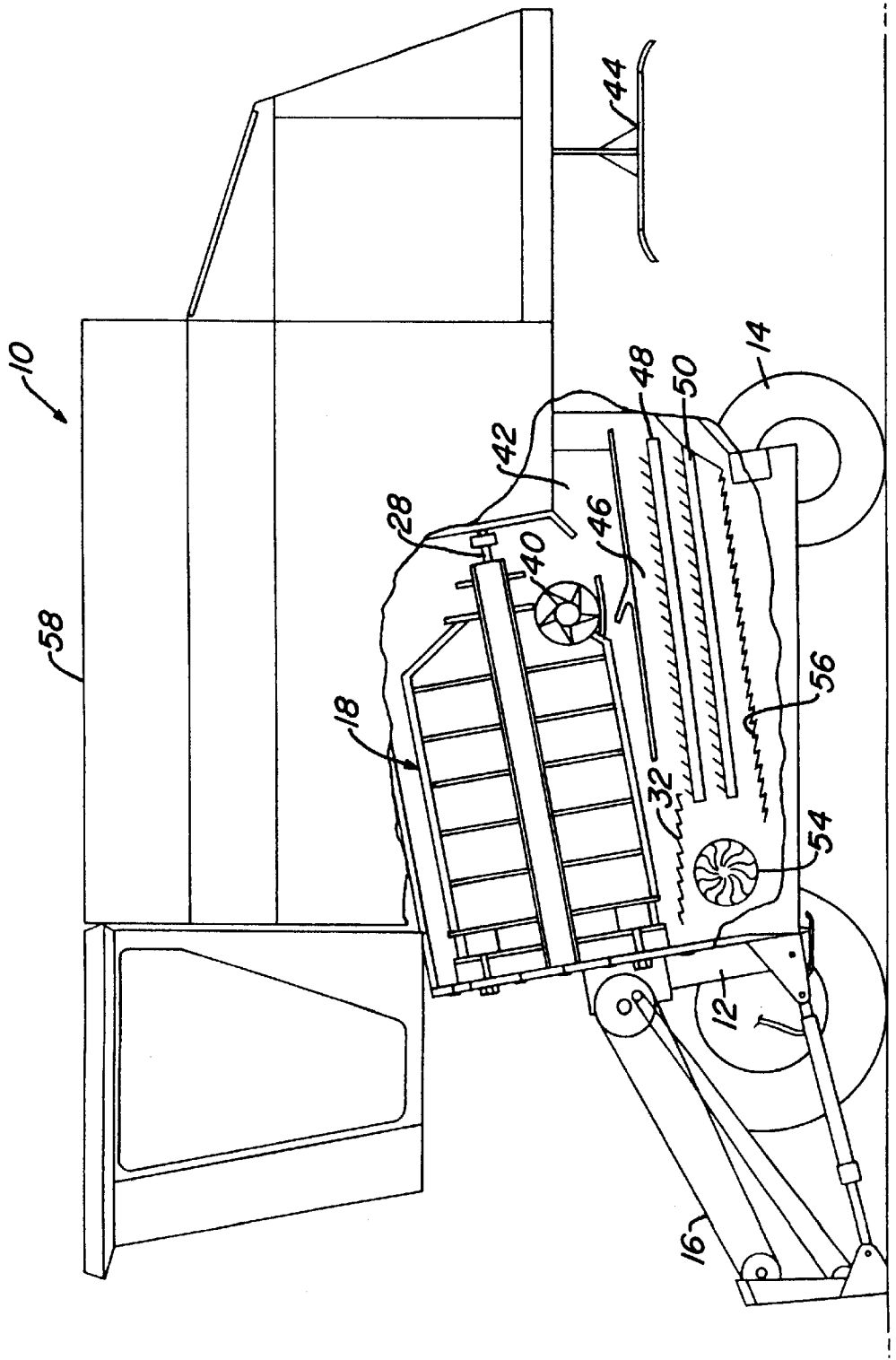
FIG. 1 is a schematic of a grain combine, shown with a portion of the exterior of the combine cut away to reveal a threshing assembly of the combine.

FIG. 1 shows a combine 10 having a frame 12, which is mounted on wheels 14. The combine 10 has an engine (not shown) for powering equipment and driving the combine 10. A header assembly at 16 is mounted at the forward end of the combine 10 and is used for crop cutting and delivery. The cut crop is conveyed to a threshing assembly 18 mounted to the frame 12 of the combine 10.

The threshing assembly 18 is formed from a threshing rotor 20 (FIG. 2) housed within a threshing cage or grate 22. In the present embodiment, the threshing rotor 18 is comprised of a generally cylindrical rotor body 24 having a plurality of rasp bars 26 mounted to and projecting radially outward from the rotor body 24. As can be seen, the rasp bars 26 are spaced apart both longitudinally, along the length of the rotor body 24 from the forward end to the rearward end, and circumferentially on the rotor body 24. The threshing rotor 20 is driven about a central, longitudinal axis, oriented generally parallel to the longitudinal axis of the combine 10, by means of a drive shaft 28, which is powered by the combine engine (not shown).

Figure 3:
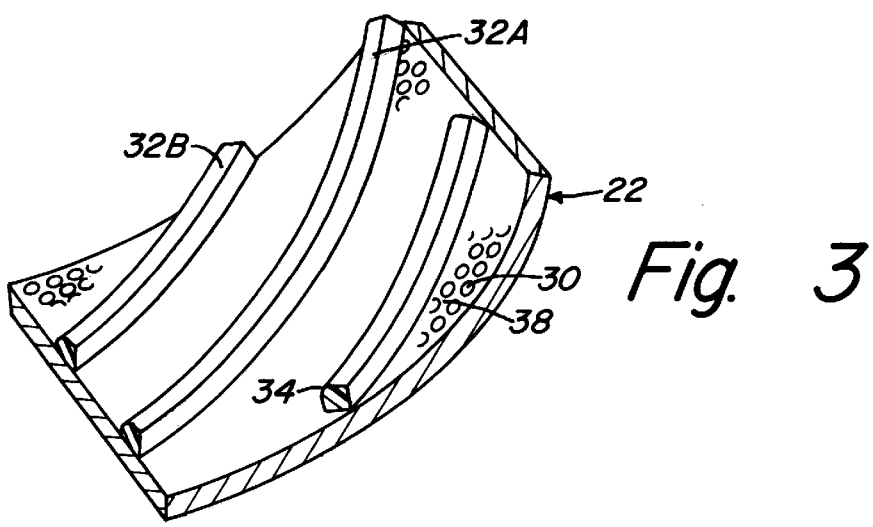
FIG. 3 is a perspective view of a portion of the threshing cage.

In the present embodiment, the threshing cage 22 is a hollow cylinder mounted so that it is coaxial with the threshing rotor 20. The threshing cage 22 is also rotated by the drive shaft 28 in the same direction as the threshing rotor 20, but at a much slower rate. The different rates of rotation for the threshing rotor 20 and cage 22 is accomplished through the use of different pulleys or gears (not shown) coupled to the drive shaft 28. The threshing cage 22 has a smooth interior surface with perforations or openings 30 (FIG. 3) located generally over the entire cage and sized to allow the passage of threshed grain from the interior of the cage 22 to the exterior.

Mounted to the interior surface of the threshing cage 22, by means of bolts or other fastners, are helical vanes 32A, 32B. More than one set of vanes, as designated by vanes 32A and 32B, may be used so that the vanes are interspaced or overlapped with the other. Unless otherwise specified, reference to the vanes 32 generally applies to both vane sets 32A, 32B. The helical vanes 32 are formed from a polymeric material, such as a high density, high strength plastic. The angle of the helical vanes 32 is typically anywhere between 5° to 20°, but may depend upon the number of vanes 32 used and the spacing between the vanes 32. Larger angles result in material being passed through the threshing assembly 18 much quicker. The space between the vanes 32 should be slightly less than the average length of a corn cob. This prevents cobs oriented longitudinally, with respect to the axis of rotation, from rolling between the vanes 32 of the rotating threshing cage 22. Such spacing, however, allows corn cobs oriented transversely to be accommodated between the vanes in a side-by-side fashion so that the cobs slide along the interior surface of the threshing cage 22 as it rotates, and allowing the corn cobs to roll so that all sides of the cob come into contact with the rasp bars 26 during threshing.

Figure 4:
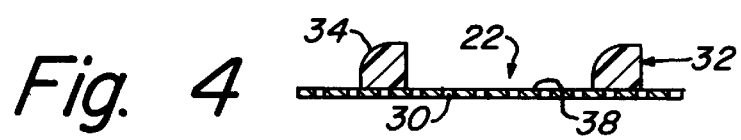
FIG. 4 is a cross-sectional side view of a portion of the threshing cage of FIG. 3.

The vanes 32 extend generally the entire length of the threshing cage 22 and have a width of approximately one to two inches. The vanes 32 have a generally rectangular cross section except for the leading or forward-facing edge 34 of the vane 32, which may be sloped or a convex curve, as shown in FIG. 4. This allows grain and crop material to ride easily over the tops of the vanes 32 during threshing. The radial height of the vanes 32, as measured from the inner surface of the threshing cage 22, decreases along the length of the threshing cage 22, from the forward end to the rearward end. By way of example, the height of the vanes 32 at the forward end of the cage 22 may be about one inch for the first ten inches. For the next ten inches of the cage 22, the vane heights may be around ¾ inch, with the next ten inches having a vane height of about ⅝ inch. For the remaining length of the cage 22, the vane height is maintained at a half inch in height. The height of the vanes 32 may be decreased in sections, with each section of the threshing cage 22 having vanes of a constant height, but differing from section to section as described above. Alternatively, the height of the vanes 32 can be varied by continuously tapering the height of each vane 32 along its entire length.

Figure 2:
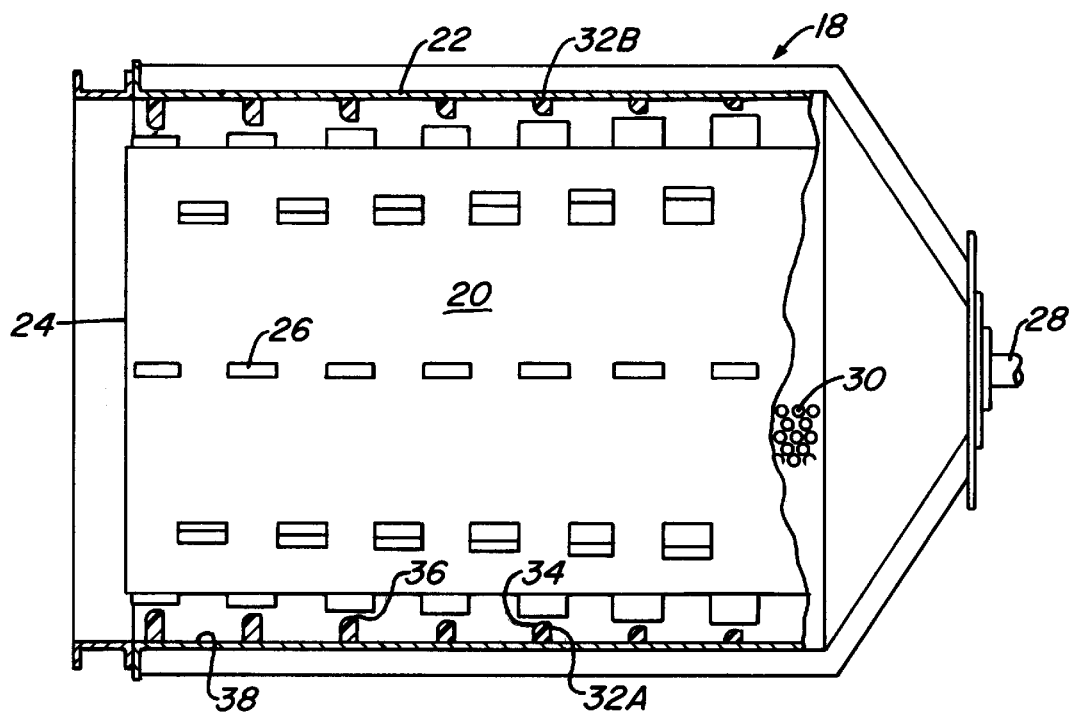
FIG. 2 is a side view of the threshing assembly having a threshing cage and rotor, with the threshing cage of the threshing assembly partially cut away to reveal the threshing rotor.

As can be seen in FIG. 2, the outermost ends of the rasp bars 26 are radially spaced from the rotor body 24 at different radial heights or distances, with the heights increasing from the forward end of the threshing rotor 20 to the rearward end. This is to correspond to the variations in height of the helical vanes 32 so that a clearance 36 exists between the rasp bars 26 and the vanes 32. This clearance 36 may be anywhere from about ¼ to ¾ inch. The clearance 36 between the rasp bars 26 and vanes 32 may be constant, but is preferably varied, with the clearance being greater at the forward end to facilitate receiving and aligning crop before threshing starts. Thus, for example a ¾ inch clearance 36 may exist between the rasp bars 26 and the tops of the vanes 32 for the front ten inches of the threshing rotor 20, with the clearance 36 for the remainder of the threshing assembly 18 being about ½ inch.

The varying height of the rasp bars 26 also creates a varying clearance between the inner screen surface 38 of the threshing cage 22. At the entrance or forward end of the threshing assembly 18, the clearance between the rasp bars 26 and screen surface 38 should be slightly greater than the diameter of an unthreshed corn cob. This helps in aligning the corn cobs between the vanes 32 prior to threshing. In the midsection or threshing region of the threshing assembly, the rasp bars 26 should reach up to half the depth of the upper grain layer of the corn cobs. The reduced clearances between the rasp bars 26 and screen surface 38 accommodates the reduced diameter of the corn cobs, as the grain is removed, to maintain threshing.

A transverse beater 40 is mounted to the combine 10 at the rearward end of the threshing assembly 18. The transverse beater 40 forces the threshed crop residue out of the combine 10 through opening 42 to a chaff distributer 44.

Located below the threshing assembly 18 is a sieve section 46. The sieve section consists of an upper sieve 48 and a lower sieve 50. The sieves 48, 50 are flat plates or trays having a number of small apertures (not shown) for grain to fall through. A grain or ripple pan 52, located below the forward end of the threshing assembly 18, directs grain from the threshing assembly 18 on to the sieves 48, 50. A fan or blower 54 located forward of the sieves 48, 50 blows air upward and rearward through the sieves 48, 50, for blowing chaff rearward and out of the combine 10 to the chaff spreader 44. Clean grain falls through the sieves 48, 50 to a grain floor 56, where it is collected and conveyed to a grain bin 58 by a grain conveyor (not shown).

The operation of the combine 10 and threshing assembly 18 is as follows. Crop is cut and gathered by means of the header assembly 16 and directed into the front of the threshing assembly 18. The cut crop is forced into the space between the rotor body 24 and threshing cage 22. Because of the large clearances between the rasp bars 26 and threshing cage screen surface 38, large grain crops, such as corn cobs, are aligned between the vanes 32. The combination of the helical vanes 32 and the rotating motion of the rotor 20 and threshing cage 22 will cause the grain crop to be passed between the vanes towards the rear of the threshing assembly 18. As this occurs, in the case of corn, the rasp bars 26 agitate and force the grain from the cob. The large clearance will allow the cobs to roll in the space between the vanes 32. Due to the greater height of the rasp bars 26 towards the rear of the assembly 18, the cobs continue being threshed even though the diameter of the cobs is reduced with the removal of the grain.

For smaller grain crops, such as wheat, threshing occurs as the crop rides over the vanes 32. The rasp bars 26 create a shearing action of the crop with the upper surface of the vanes 32 so that grain is removed. Because of this, it is important that the small grain crops ride easily over the vanes 32. The reduced height of the vanes 32 towards the rear of the threshing assembly 18 create this easy crop ride to ensure that the smaller grain crops are threshed. Further, the sloped or curved leading edge 34 also facilitates the riding of crop material over the taller vanes 32 and with less damage to the straw. Where small grain crops are going to be harvested, a greater vane width may be preferable to thus provide a better threshing surface.

Cobs and unthreshed crop residue are eventually passed out of the rearward end of the threshing assembly 18 to the beater 40. The free or threshed grain falls from the threshing cage 22 through the apertures or perforations 30 to the sieve section 46. In the sieve section 46, chaff is blown rearward out of the combine 10 by means of the blower 54. Chaff and crop residue from the beater 40 are distributed evenly to the rear of the combine 10 by the chaff distributor 44. Clean grain falls through the sieves 48, 50 to the grain pan 52, where it is collected and transported to the grain bin 58 of the combine 10.

The grain combine and threshing assembly have several advantages over the prior art. Different size grain crops can be threshed with the same threshing assembly without making adjustments are replacing components. Because the vane heights are greater at the forward end of the threshing assembly, alignment of corn and other large grain crops between the guide vanes is accomplished. Threshing of these larger crops occurs as the crop is agitated between the threshing cage surface and rasp bars. The vane heights are great enough to maintain placement of the cobs between the vanes and ensure complete threshing even as grain material is removed and the diameter of the cobs decreases. By decreasing the height of the vanes and providing the sloped or curved leading edge, smaller grain crops ride easily over the vanes so that they can be threshed with the same threshing unit.

The vane itself is also an improvement over the prior art. Because the vanes are manufactured of plastic material instead of steel, they are easy to manufacture and less expensive to replace. In addition, plastic vanes have the advantage that should a rock or other hard object strike the vane, the vane will tend to distort in an isolated area instead of bending or damaging the entire vane or the threshing cage itself. Further, the use of plastic guide vanes makes the adjustment of the vanes easy to accomplish, and makes straightforward the manufacture of a continuous vane set that is tapered along its length.

While the invention has been shown in only one of its forms, it should be apparent to those skilled in the art that it is not so limited, but is susceptible to various changes or modifications without departing from the scope of the invention.

What is claimed is:

1. A threshing assembly for a combine having a frame mounted on wheels, the threshing assembly comprising:

a perforated threshing cage having a forward end and a rearward end, the threshing cage being mounted to the frame of the combine;

a threshing rotor having a forward end and a rearward end disposed within the threshing cage, the threshing rotor rotating about an axis;

means for rotating the threshing rotor about the axis;

at least one helical vane mounted to the interior of the threshing cage, the helical vane extending alone the length the threshing cage, wherein the radial height of the vane is graduated along the length of the threshing cage from the forward end to the rearward end for threshing of different size grain crop; and wherein the helical vane height decreases continuously from the forward end to the rearward end of the threshing cage.

2. A threshing assembly for a combine having a frame mounted on wheels, the threshing assembly comprising:

a perforated threshing cage having a forward end and a rearward end, the threshing cage being mounted to the frame of the combine;

a threshing rotor having a forward end and a rearward end disposed within the threshing cage, the threshing rotor rotating about an axis;

means for rotating the threshing rotor about the axis;

at least one helical vane mounted to the interior of the threshing cage, the helical vane extending along the length the threshing cage, wherein the radial height of the vane is graduated along the length of the threshing cage from the forward end to the rearward end for threshing of different size grain crop; wherein the threshing rotor includes a rotor body with rasp bars mounted along the length of the rotor body from the forward end to the rearward end, and wherein the rasp bars project radially outward in close proximity to the helical vane; wherein the rasp bars project from the rotor body at different radial heights, as measured from the axis; and wherein the radial heights of the rasp bars increase from the forward end to the rearward end of the threshing rotor.

3. A threshing assembly for a combine having a frame mounted on wheels, the combine having a longitudinal axis, the threshing assembly comprising:

a generally cylindrical threshing cage having a forward end and a rearward end, the threshing cage being mounted to the frame of the combine, the threshing cage being perforated to allow passage of threshed grain from the interior of the cage to the exterior;

a threshing rotor having a forward end and a rearward end, the threshing rotor being disposed within the threshing cage, the threshing rotor rotating about an axis generally parallel to the longitudinal axis of the combine;

means for rotating the threshing rotor; and at least one helical vane mounted to the interior of the threshing cage, the helical vane extending along the length of the threshing cage, and wherein the radial height of the vane decreases along the length of the threshing cage from the forward end to the rearward end for threshing of different size grain crop; and wherein:

the helical vane height decreases continuously from the forward end to the rearward end of the threshing cage.

4. A threshing assembly for a combine having a frame mounted on wheels, the combine having a longitudinal axis, the threshing assembly comprising:

a generally cylindrical threshing cage having a forward end and a rearward end, the threshing cage being mounted to the frame of the combine, the threshing cage being perforated to allow passage of threshed grain from the interior of the cage to the exterior;

a threshing rotor having a forward end and a rearward end, the threshing rotor being disposed within the threshing cage, the threshing rotor rotating about an axis generally parallel to the longitudinal axis of the combine;

means for rotating the threshing rotor;

at least one helical vane mounted to the interior of the threshing cage, the helical vane extending along the length of the threshing cage, and wherein the radial height of the vane decreases along the length of the threshing cage from the forward end to the rearward end for threshing of different size grain crop;

the threshing rotor includes a rotor body with rasp bars mounted along the length of the rotor body from the forward end to the rearward end;

wherein the rasp bars project radially outward in close proximity to the helical vane; and wherein:

the radial heights of the rasp bars increase from the forward end to the rearward end of the threshing rotor.

5. A threshing assembly for a combine having a frame mounted on wheels, the threshing assembly comprising:

a perforated threshing cage having a forward end and a rearward end, the threshing cage being mounted to the frame of the combine;

a threshing rotor having a forward end and a rearward end disposed within the threshing cage and rotating about an axis, the threshing rotor including a rotor body with rasp bars mounted along the length of the rotor body from the forward end to the rearward end, and wherein the rasp bars project radially outward a distance from the axis;

means for rotating the threshing rotor about the axis;

a helical vane mounted to the interior of the threshing cage, the helical vane extending along the length the threshing cage and projecting radially inward a distance from the interior of the threshing cage; wherein at least one of the helical vane and rasp bars project at different radial heights along the length of the threshing assembly; and wherein the rasp bars increase in radial height from the forward end to the rearward end of the threshing rotor.

6. A threshing assembly for a combine having a frame mounted on wheels, the threshing assembly comprising:

a perforated threshing cage having a forward end and a rearward end, the threshing cage being mounted to the frame of the combine;

a threshing rotor having a forward end and a rearward end disposed within the threshing cage and rotating about an axis, the threshing rotor including a rotor body with rasp bars mounted along the length of the rotor body from the forward end to the rearward end, and wherein the rasp bars project radially outward a distance from the axis;

means for rotating the threshing rotor about the axis;

a helical vane mounted to the interior of the threshing cage, the helical vane extending along the length the threshing cage and projecting radially inward a distance from the interior of the threshing cage; wherein at least one of the helical vane and rasp bars project at different radial heights along the length of the threshing assembly; and wherein the helical vane height decreases continuously from the forward end to the rearward end of the threshing cage.

* * * * *